United States Patent [19]

Kemner

[11] Patent Number: 4,662,670

[45] Date of Patent: May 5, 1987

[54] TRACTOR-TRUCK CONVERSION

[76] Inventor: John B. Kemner, 1508 Maydell Dr., Tampa, Fla. 33619

[21] Appl. No.: 793,709

[22] Filed: Oct. 31, 1985

[51] Int. Cl.[4] .............................................. B62D 23/00
[52] U.S. Cl. ................................. 296/35.3; 280/423 R
[58] Field of Search ........................... 296/35.3, 35.1; 280/423 R, 425, 433

[56] References Cited

U.S. PATENT DOCUMENTS

| | | | |
|---|---|---|---|
| 2,151,640 | 3/1939 | Menning | 296/35.3 |
| 3,004,772 | 10/1961 | Bohlen et al. | 280/433 |
| 4,047,733 | 9/1977 | Parkes | 280/423 |
| 4,496,166 | 1/1985 | Anderson | 280/423 |

Primary Examiner—Robert R. Song
Attorney, Agent, or Firm—Stein, Reese & Prescott

[57] ABSTRACT

A tractor-truck conversion apparatus for converting a conventional tractor of a tractor-trailer combination to transport a commercial or military body. The apparatus comprises a pair of adjustably mounted hangers depending from the rearward underside of the body for engagement with a rod welded transversely to the tractor's frame and an adjustably mounted king pin affixed to the forward underside of the body for engagement by the fifth wheel of the tractor.

7 Claims, 4 Drawing Figures

TRACTOR-TRUCK CONVERSION

BACKGROUND OF THE INVENTION

1. Field of the Invention

This invention relates generally to vehicles designed for transporting loads from one location to another. More particularly, this invention relates to conversion bodies especially adapted to be used in conjunction with a conventional tractor of a tractor-trailer combination.

2. Description of the Background Art

Presently, conventional tractor-trailer combinations comprise an eight-wheeled cargo or flatbed trailer which is towed by a ten-wheeled tractor via a "fifth wheel", as that term is commonly used in the industry. More particularly, the fifth wheel attachment mechanism comprises a fifth wheel pin, sometimes also referred to as a "king pin", rigidly fastened forwardly to the underside of the trailer to be towed. A fifth wheel plate is affixed to the frame of the tractor and includes a pin slot for receiving the king pin. During hook-up, the tractor is backed up to the trailer in alignment with the king pin such that the king pin engages into the slot in the fifth wheel. A locking mechanism in the fifth wheel secures the king pin from disengagement while allowing it to rotate during towing of the trailer.

The tractor-trailer combination as briefly discussed above is prevalent throughout the entire world. Standardization is commonplace, allowing one particular type of tractor to tow multitudes of trailers without altering the tractor or trailer except to possibly shift the fifth wheel forward or backward along the frame of the tractor to assure proper weight distribution. Indeed, the standardization of the tractors and trailers has been an influencing factor to truckers who wish to purchase a tractor and haul trailers of varying sorts on a contract basis. Consequently, many brokerage firms presently exist which broker and schedule trailer loads by individually owned tractors.

While a tractor and trailer combination is highly standardized, one particular disadvantage associated with the industry is the inability to use the tractor for any purpose other than hauling trailers. More specifically, during a period of inactivity, when the trucker is waiting to be brokered a new trailer-load for hauling, the tractor is unused, usually parked in the yard of the trucker's home. The same disadvantages associated with non-use of the tractor between loads is also quite acute in trucking fleets as there are always some tractors of the fleet which are not used and simply sit idle.

Therefore, it is an object of this invention to provide a method which overcomes the aforementioned inadequacies of the prior art methods and provides an improvement which is a significant contribution to the advancement of the tractor-trailer art.

Another object of this invention is to provide means for increasing the versatility of conventional tractors commonly used to tow only conventional trailers.

Another object of this invention is to provide an attachment means allowing a body to be removably mounted on the frame of a conventional tractor or truck having a fifth wheel affixed to its frame thereby increasing the versatility and use of conventional tractors and trucks, with the body comprising one of many possible commercial bodies such as a flatbed, a van-type body, a refrigerated van body, a utility body, a wrecker or boom-type body or many types of military bodies such as an ammunition carrier body, a personnel carrier body, a rocket-launcher body, a water/fuel hauling body, or cannon-mount bodies.

Another object of this invention is to provide a stand allowing the body containing the attachment means to be quickly and easily removed from the frame of the tractor and stored for subsequent use.

Another object of this invention is to provide a stand which is positioned in a fixed location or which is wheeled allowing the stand to be transported from one location to another for loading or removing the body from the tractor.

The foregoing has outlined some of the more pertinent objects of the invention. These objects should be construed to be merely illustrative of some of the more prominent features and applications of the intended invention. Many other beneficial results can be attained by applying the disclosed invention in a different manner or modifying the invention within the scope of the disclosure contained herein and in the above identified patents, the disclosure of which is hereby incorporated by reference herein. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with a specific embodiment shown in the attached drawings. For the purpose of summarizing the invention, the invention comprises a conversion apparatus for converting a conventional tractor of a tractor-trailer combination to transport a commercial or military body. More particularly, the conversion apparatus comprises a pair of hangers positioned in a spaced-apart manner and extending downwardly in a depending manner from the underside of the body to be converted. The hangers are preferably adjustably mounted on tracks allowing adjustment of the hangers forwardly or rearwardly along the rearward end of the underside of the body, while still maintaining their spaced-apart relationship. The attachment means further includes a conventional king pin affixed forwardly to the underside of the body. A stand is provided for storing the body in an elevated position above the ground at a level such that the king pin engages into the fifth wheel of the tractor.

During use, the tractor is simply backed up under the body in alignment therewith such that the king pin engages into the fifth wheel of the tractor, thereby rigidly attaching the forward end of the body to the tractor via the king pin and fifth wheel mechanism. The rearward end of the body is affixed to the frame of the tractor by means of the depending hangers which engage about a rod welded transversely to the tractor's frame. In the preferred embodiment, the hangers each include a horizontal slot into which the respective ends of the rod engage, thereby securing the body to the frame of the tractor and prevent upward or bouncing movement of the body on the frame.

From the brief description above, it should be quickly realized that the depending hangers can be adapted to virtually any type of body. Indeed, without limitation, possible bodies may include commercial bodies such as flat bodies, van bodies, refrigerated van bodies, utility bodies, or wrecker/boom bodies and military bodies such as ammunition bodies, personnel carrier bodies, rocket launcher bodies, water/fuel bodies and cannon bodies. The type of body transported by the tractor with the attachment mechanism incorporated thereto is virtually limitless because of the great load capacity of conventional tractors. Finally, it should be quickly apparent that any type of conventional tractor can be adapted to receive the body including the depending hangers since the only alteration to the tractor that is required is the positioning of the rod transversely through its frame. Such a rod, which is preferably positioned at the rearmost portion of the frame, does not interfere with the normal activities of the tractor in towing conventional trailers.

The adjustability of the hangers along the rearward portion of the body to which they are attached inherently provides means for adjusting the weight distribution of the body on the tractor. Finally, still additional adjustment of weight distribution can be accomplished by providing means for threadably engaging the king pin in different longitudinal locations along the forward portion of the underside of the body thereby providing a variety of different pin settings and allowing the user to remove the king pin from one pin setting to another to coincide with the setting of the fifth wheel attachment which may be adjusted along the frame of the body in a conventional manner to additionally equalize the weight distribution thereby providing a more stable environment.

It is noted above that the invention further comprises a stand for storing the body in an elevated position off the ground allowing the tractor to be backed up under the body until the king pin engages the fifth wheel attachment and the depending hangers engage the transverse rod affixed to the frame of the tractor. The stand of the invention comprises two upstanding fixed rearward posts to support the rearward corners of the body. The stand also includes two upstanding forward posts having horizontally disposed arms for engagement under the forward portion of the body to support the weight thereof. The horizontal arms are pivotable about a vertical axis and can be pivoted out from under the body after the body has been loaded onto the tractor, thereby allowing the body to be removed from the stand as the truck pulls out without hitting the upstanding posts. Finally, without departing from the spirit and scope of this invention, the stand itself may be made transportable by affixing a pair of wheels at one end and affixing a conventional trailer tongue and hitch on the other such that the stand may be tranported to different locations. The transportable stand may be desirable in the event that the tractor, mounted with a loaded body, becomes disabled on the highway. More particularly, the stand could be transported to the site allowing the loaded body to be removed from the tractor and the tractor repaired.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
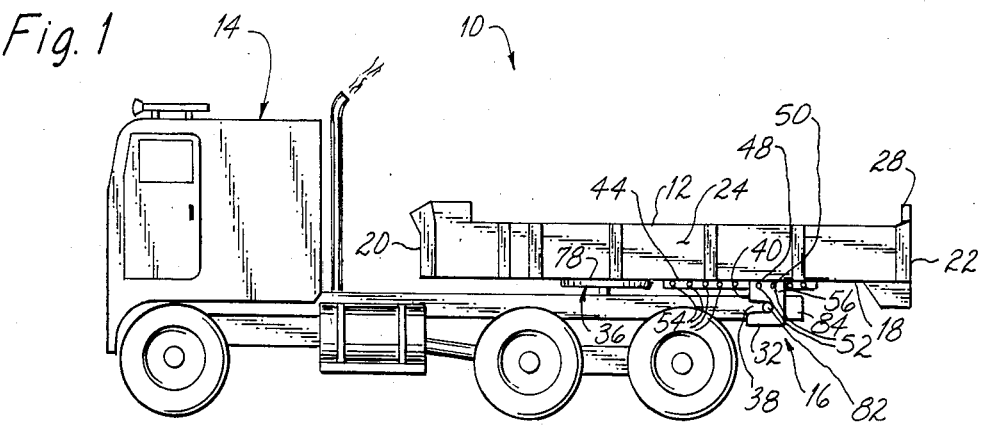
FIG. 1 is a side view of the conversion body of the invention mounted on a conventional tractor.

The conversion body of the invention, generally indicated by numeral 10, a body 12 of adapted to be removably mounted on a conventional tractor 14 by means of an attachment means, generally indicated by numeral 16. Body 12 may comprise, without limitation, any type of body such as those previously discussed above. As illustrated in the drawings, body 12 comprises a floor 18 having upstanding wall 20, rear wall 22 and side walls 24 and 26 positioned to define an open-ended boxed body. The body 12 may further comprise a tailgate 28.

Figure 2:
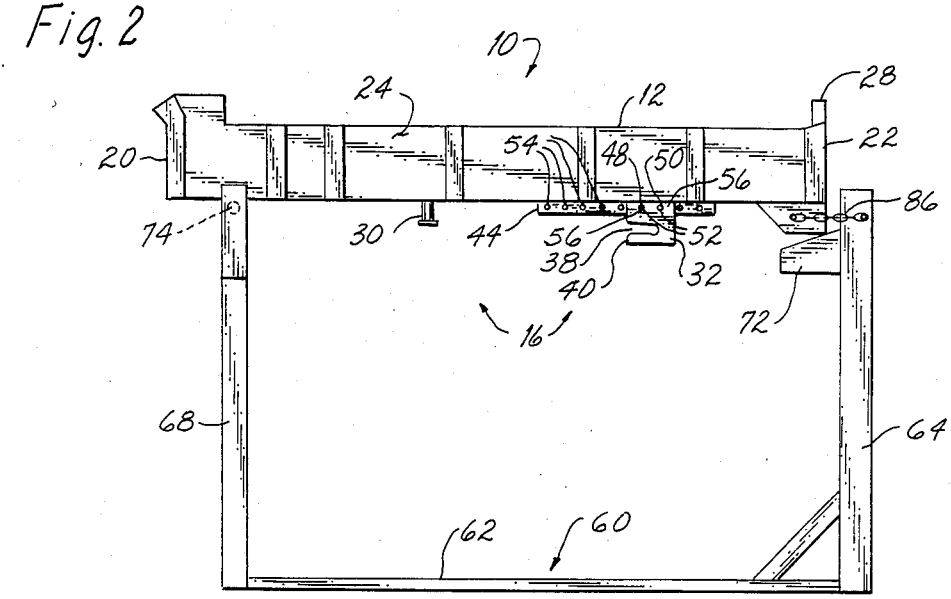
FIG. 2 is a side view of the conversion body of the invention positioned on a stand, ready to be mounted on the tractor as the tractor is backed thereunder.
Figure 3:
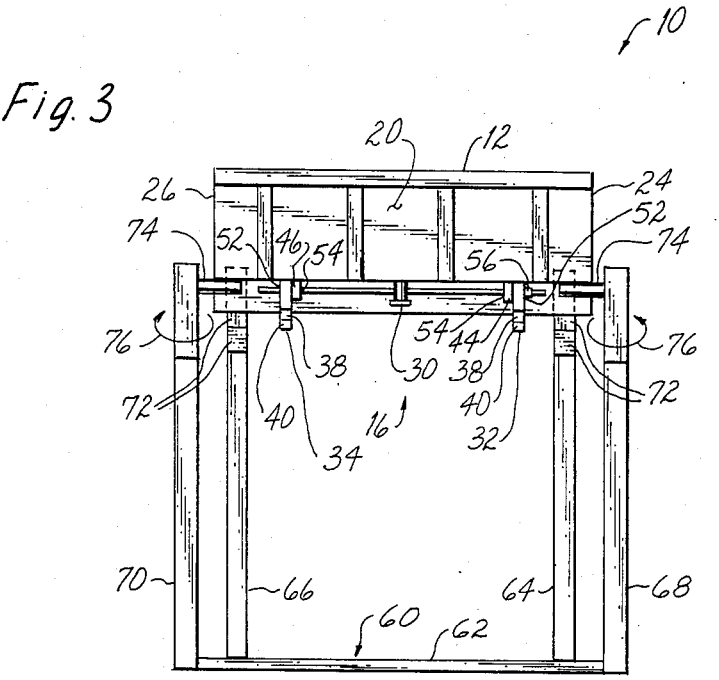
FIG. 3 is a front view of FIG. 2 illustrating the upstanding front posts of the stand and the manner in which the horizontal arms thereof pivot out from under the body after the body is loaded onto the tractor.
Figure 4:
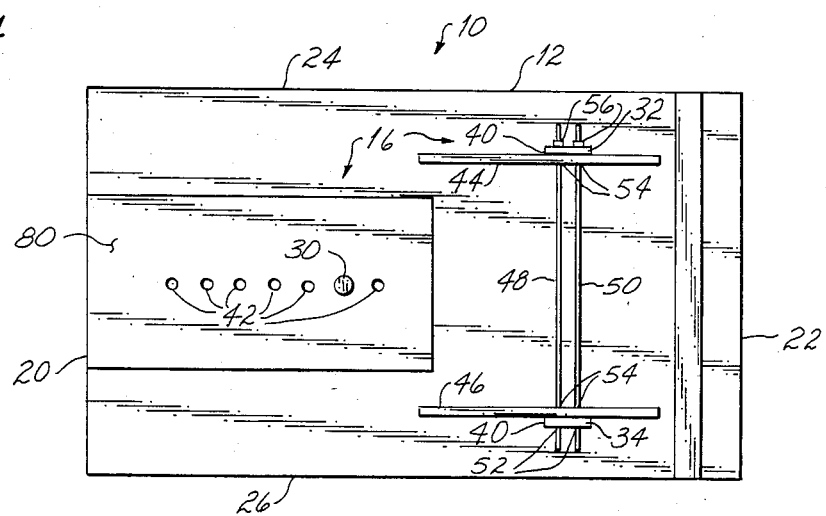
FIG. 4 is a bottom view of the conversion body of the invention illustrating the adjustability of the hangers and the adjustability of the king pin.

Referring to FIGS. 2, 3 and 4, the attachment means generally indicated by numeral 16 comprises a king pin 30 connected to the underside of the forward end of the body 12 and extending downwardly in a depending manner. The attachment means 16 further comprises a pair of hangers 32 and 34 positioned in a spaced-apart manner and depending from the underside of the body 12 toward its rearward portion. More particularly, king pin 30 comprises a conventional king pin dimensioned to fit into the fifth wheel attachment 36 of the tractor 14 and be locked therein in a conventional manner. Hangers 32 and 34 preferably comprise a generally flat configuration positioned substantially parallel to the longitudinal axis of the body 12. Each horizontal slot 38 extends from the front edge 40 of the hangers 32 or 34 into the hangers 32 or 34 by a distance approximately equal to two-thirds of their longitudinal width.

King pin 30 is preferably adjustably mounted to the underside of the front portion of the body 12. While many embodiments are possible, the preferred embodiment comprises a plurality of threaded nut plates 42 which are rigidly affixed to the undersigned of the forward portion of the body 12. With the king pin 30 being likewise threaded to threadably engage into one of the threaded nut plates 42, it is readily apparent that the king pin 30 may be adjustably positioned in any one of the threaded nut plates 42 to properly equalize weight distribution on the tractor 14.

Hangers 32 and 34 may similarly be adjustable to not only be adaptable to a variety of tractors 14, but to also assure proper weight distribution. More particularly, hangers 32 and 34 may be operatively mounted on a pair of adjustment rails 44 and 46 by means of transversely mounted rods 48 and 50 which are removably fitted through apertures 52 in hangers 32 and 34 and apertures 54 in adjustment rails 44 and 46. This embodiment allows the hangers 32 and 34 to be adjustably mounted along the rails 44 and 46 by simply removing the transverse rods 48 and 50, positioning the hangers 32 and 34 in a proper location and then reinserting the rods 48 and 50 through apertures 52 in the hangers 32 and 34 and through the aligned apertures 54 in the adjustment rails 44 and 46. A locking mechanism, generally indicated by numeral 56, may be locked on each of the exposed ends of the transverse rods 48 and 50 to assure that the rods 48 and 50 do not disengage from apertures 52 and 54 during use.

Finally, the invention further comprises a stand generally indicated by numeral 60 which functions to retain the conversion body 12 in an elevated position above the ground during non-use. Also, stand 60 functions to load and unload the body 12 from the tractor 14. More particularly, stand 60 comprises base member 62 having two vertically disposed rear posts 64 and 66 and two vertically disposed forward posts 68 and 70. Each of the rear posts 64 and 66 comprises a downwardly sloping arm 72 positioned longitudinally with the axis of the stand 60 at a height substantially equal to the height of the body 12 when mounted on tractor 14. Each forward post 68 and 70 comprises a pivotable horizontal arm 74 positioned also at a height substantially equal to the height of the front portion of body 12 when mounted on tractor 14. Arm 74 is pivotably mounted to rotate about the vertical axis of the front post 68 as indicated by numeral 76 in FIG. 3.

Referring again specifically to FIGS. 2 and 3, the body 12 is loaded onto the tractor 14 by simply backing the tractor 14 into position between forward posts 68 and 70 and underneath body 12. As the tractor 14 is backed up, its fifth wheel plate 78 engages under the lower edge of front wall 20 of the body 12 in alignment with the king pin 30. It is noted that a slide plate 80 may be mounted under the front portion of the body 12 to assure smooth sliding of the fifth wheel plate 78 thereunder. Continued rearward movement of the tractor 14 eventually engages king pin 30 into the fifth wheel attachment 36 thereby locking the king pin 30 into position. Simultaneously, hangers 32 and 34 become aligned with a transverse support rod 82 extending transversely through the rearwardmost portion of the frame 84 of tractor 14 and extending outwardly therefrom a distance sufficient to be engaged by the hangers 32 and 34. The final rearward movement of the tractor 14 under body 12 causes the support rod 82 to be fully engaged into the horizontal slot 38 of the hangers 32 and 34 thereby rigidly securing the body 12 to the tractor 14. Arms 74 of the front posts 68 and 70 are then pivoted away from underneath the body 12 in the direction of arrow 76 and the tractor 14 simply drives out from between the front posts 68 and 70, ready for use.

During unloading, the tractor 14 having the body 12 mounted thereon simply backs into the stand 60 between the front posts 68 and 70 until the lowermost edge of rear wall 22 engages sloped arms 72 of rear posts 64 and 66. A chain 86 is fastened to each of the side walls 24 and 26 of the body 12 and to the rear posts 64 and 66. Arms 74 are then re-pivoted to a position underneath the side walls 24 and 26 of the body. King pin 30 is disengaged from the fifth wheel attachment 36 and the tractor 14 is driven out from under the body 12. In this regard, it is noted that as the tractor 14 drives out from under the body 12, chain 86 forces the body 12 to remain on the stand 60 supported by arms 72 and 74 of posts 64-70.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit of the invention. Now that the invention has been described,

What is claimed is:

1. A conversion body for mounting on a tractor or truck having a fifth wheel, comprising in combination:
  a body;
  attachment means for removably mounting said body onto the tractor/truck, said attachement means comprising a king pin affixed to the underside of the front portion of said body for removable engagement with the fith wheel attachement of the tractor/truck and hanger means extending downwardly from the underside of said body for operative engagement with the frame of the tractor/truck, said hanger means comprising a pair of hangers positioned in a spaced-apart relationship underneath said body;
  said attachment means further comprising a support rod positioned transversely through the frame of the tractor/truck for operative engagement with said hangers, said hangers each comprising a horizontal slot from a front edge for engagement with said support rod when said body is mounted on the tractor/truck; and
  said attachement means further comprising means for adjustably mounting said hangers to the underside of said body, said adjustable hanger mounting means comprising a pair of adjustment rails and means for adjustably mounting said hangers to said rails along the length of said rails.

2. The conversion body as set forth in claim 1, wherein said attachement means further comprises means for adjustably mounting said king pin to the underside of said body.

3. The conversion body as set forth in claim 2, wherein said adjustable king pin mounting means comprises a plurality of threaded nut plates affixed to the underside of said body allowing said king pin to selectively engage one of said threaded nut plates.

4. The conversion body as set forth in claim 1, further including stand means for storing said body in an elevated position above the ground allowing said body to be loaded and unloaded from the tractor/truck.

5. The conversion body as set forth in claim 4, wherein said stand comprises a pair of upstanding rear posts, each having a horizontally disposed arm for engagement under said rear portion of said body and a pair of upstanding forward posts, each having a horizontally extending arm for engagement under said side portion of said body.

6. The conversion body as set forth in claim 5, wherein said arms of said forward posts are pivotably mounted to rotate about a vertical axis.

7. The conversion body as set forth in claim 5, further including chain means for securing said body to said stand during unloading of said body from said tractor/truck.

* * * * *